(12) United States Patent
Kojima

(10) Patent No.: US 6,275,896 B1
(45) Date of Patent: *Aug. 14, 2001

(54) DATA TRANSFER APPARATUS AND METHOD OF THE SAME AND DATA INPUT AND OUTPUT CONTROLLING APPARATUS AND METHOD OF SAME

(75) Inventor: Toshiaki Kojima, Kanagawa (JP)

(73) Assignee: Sony Corporation, Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 08/979,755

(22) Filed: Nov. 26, 1997

(30) Foreign Application Priority Data

Nov. 27, 1996 (JP) .................................................. 8-316027

(51) Int. Cl.⁷ ........................................................ H04J 3/16
(52) U.S. Cl. ........................... 711/112; 711/111; 711/154; 711/156; 710/52; 710/57; 710/60; 709/232; 709/233
(58) Field of Search ........................... 711/111, 112, 154, 711/156; 709/232, 233; 710/52, 57, 60

(56) References Cited

U.S. PATENT DOCUMENTS

| 5,301,351 | * | 4/1994 | Jippo | ..................................... 709/233 |
| 5,513,326 | * | 4/1996 | Nute | ........................................ 710/60 |
| 5,771,356 | * | 6/1998 | Leger et al. | ........................... 709/233 |
| 5,905,711 | * | 5/1999 | Chiussi et al. | ........................ 370/232 |

* cited by examiner

*Primary Examiner*—Than Nguyen
(74) *Attorney, Agent, or Firm*—Frommer Lawrence & Haug, LLP.; William S. Frommer; Glenn F. Savit

(57) ABSTRACT

A data transfer apparatus for transferring data between a first storage medium and a second storage medium capable of non-linear access, comprising a temporary storing means for temporarily storing at least one of data reproduced from the first storage medium and data reproduced from the second storage medium; a storage state monitoring means for monitoring the state of storage of the temporary storing means; and a transfer rate controlling means for controlling a transfer rate of at least one of the data reproduced from the first storage medium and the data reproduced from the second storage medium based on a signal indicating the state of storage input from the storage state monitoring means, a method of the same, a data input and output controlling apparatus, and a method of the same.

26 Claims, 6 Drawing Sheets

DATA TRANSFER APPARATUS AND METHOD OF THE SAME AND DATA INPUT AND OUTPUT CONTROLLING APPARATUS AND METHOD OF SAME

BACKGROUND OF THE INVENTION

1. Field of the Invention

The present invention relates to a data transfer apparatus for performing fast data transfer between a first storage medium such as a hard disk and a second storage medium and a method of the same and to a data input and output controlling apparatus and a method of the same.

2. Description of the Related Art

In recent years, hard disks, which are non-linear access storage media, have spread in use in place of magnetic tape as the media for storing audio and/or video signals etc. This is because hard disk drives enable fast access and fast transfer of data.

In "jog-shuttling" and other fast reproduction modes of video tape recorders etc., since data is reproduced only at certain intervals, the amount of the data transferred is the same as that during standard speed reproduction. "Fast transfer", on the other hand, is a function for transferring the same data as that of the standard speed reproduction at a faster rate. In the case of double speed transfer, twice the amount of data compared with that of the standard speed transfer is transferred per unit time. In this fast transfer, it is important to be able to copy the data at a high speed.

With hard disks, however, the access speed differs according to where on the disk the data is stored. Further, with hard disks, there are two types of error: recoverable error, where the stored data can be read by accessing the same location several times, and unrecoverable error, where the stored data cannot be read even by accessing the location several times. Further the time for transferring the data sometimes changes due to rotation waiting time, temperature compensation, etc.

Therefore in the related art, when for example transferring audio and/or video data between hard disks, the data transfer rate was set to the slowest expected transfer rate so as to enable fluctuations in the data transfer rate of the hard disk drive to be suitably absorbed by a limited storage capacity buffer memory. That is, the fluctuations of the transfer rate were only temporarily absorbed by the buffer memory based on the storage capacity of the buffer memory, so that it was necessary to set the rate of transfer to the hard disks somewhat slower than the actual performance of the hard disk drive so as not to overload the buffer memory.

Since, as described above, the data transfer rate between hard disks was set slower than the actual performance of the hard disk drive, it was necessary to use a hard disk drive offering a higher transfer rate than required in order to achieve the required transfer rate. This complicated the apparatus and made it more expensive.

A similar problem occurs when transferring data between magnetic tape and a hard disk.

SUMMARY OF THE INVENTION

An object of the present invention is to provide a data transfer apparatus and a method of the same and a data input and output controlling apparatus and a method of the same which enable fast data transfer to or from a hard disk, for example, fast data transfer between two hard disks or between a magnetic tape and a hard disk, by an inexpensive and simple configuration.

According to a first aspect of the present invention, there is provided a data transfer apparatus for transferring data between a first storage medium and a second storage medium capable of non-linear access, comprising a temporary storing means for temporarily storing at least one of data reproduced from the first storage medium and data reproduced from the second storage medium; a storage state monitoring means for monitoring the state of storage of the temporary storing means; and a transfer rate controlling means for controlling a transfer rate of at least one of the data reproduced from the first storage medium and the data reproduced from the second storage medium based on a signal indicating the state of storage input from the storage state monitoring means.

According to a second aspect of the present invention, there is provided a data transfer method for transferring data between a first storage medium and a second storage medium capable of non-linear access, comprising a first step of temporarily storing in a temporary storing means at least one of data reproduced from the first storage medium and data reproduced from the second storage medium; a second step of monitoring the state of storage of the data stored in the first step; and a third step of controlling a transfer rate of at least one of the data reproduced from the first storage medium and the data reproduced from the second storage medium according to the state of storage of the temporary storing means monitored in the second step.

According to a third aspect of the present invention, there is provided a data input and output controlling apparatus for controlling the output and input of a temporary storing means which temporarily stores at least one of data reproduced from a first storage medium and data reproduced from a second storage medium, comprising a storage state monitoring means for monitoring the state of storage of the temporary storing means and a data input and output controlling means for controlling the output and input of at least one of the data reproduced from the first storage medium and the data reproduced from the second storage medium with respect to the temporary storing means based on a signal indicating the state of storage input from the storage state monitoring means.

According to a fourth aspect of the present invention, there is provided a data input and output controlling method for controlling the output and input of a temporary storing means which temporarily stores at least one of data reproduced from a first storage medium and data reproduced from a second storage medium, comprising a first step of monitoring the state of storage of the temporary storing means and a second step of controlling the output and input of at least one of the data reproduced from the first storage medium and the data reproduced from the second storage medium with respect to the temporary storing means based on the state of storage of the temporary storing means of the first step.

BRIEF DESCRIPTION OF THE DRAWINGS

These and other objects and features of the present invention will be become more apparent from the following description of the preferred embodiments given with reference to the attached drawings, in which.

DESCRIPTION OF THE PREFERRED EMBODIMENTS

Below a data transfer apparatus according to an embodiment of the present invention will be explained.

Figure 1:
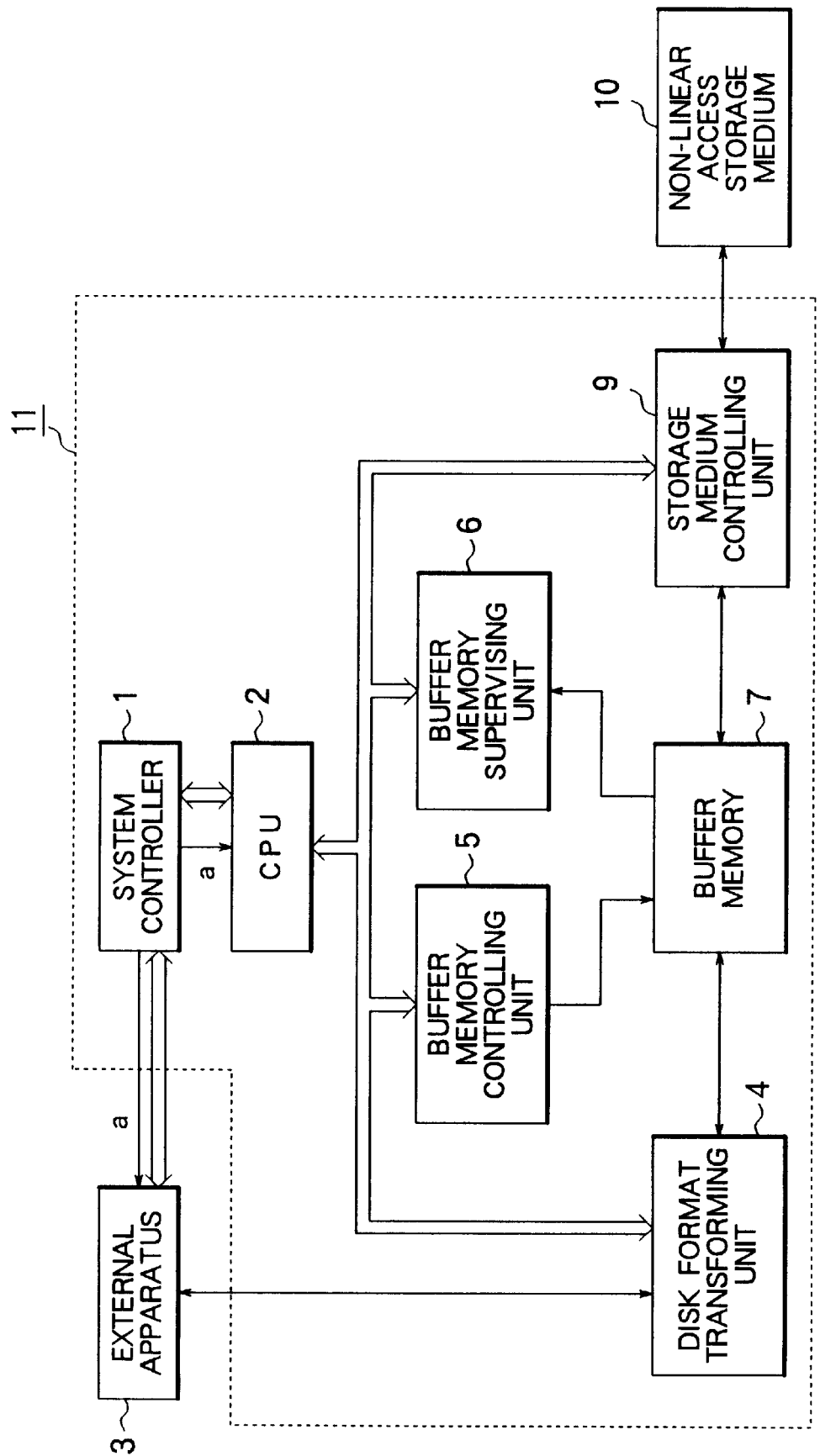
FIG. 1 is a view of the configuration when connecting a data transfer apparatus according to an embodiment of the present invention between an external apparatus and a storage medium capable of non-linear access.

FIG. 1 is a view of the configuration of the data transfer apparatus according to the present embodiment.

Figure 2:
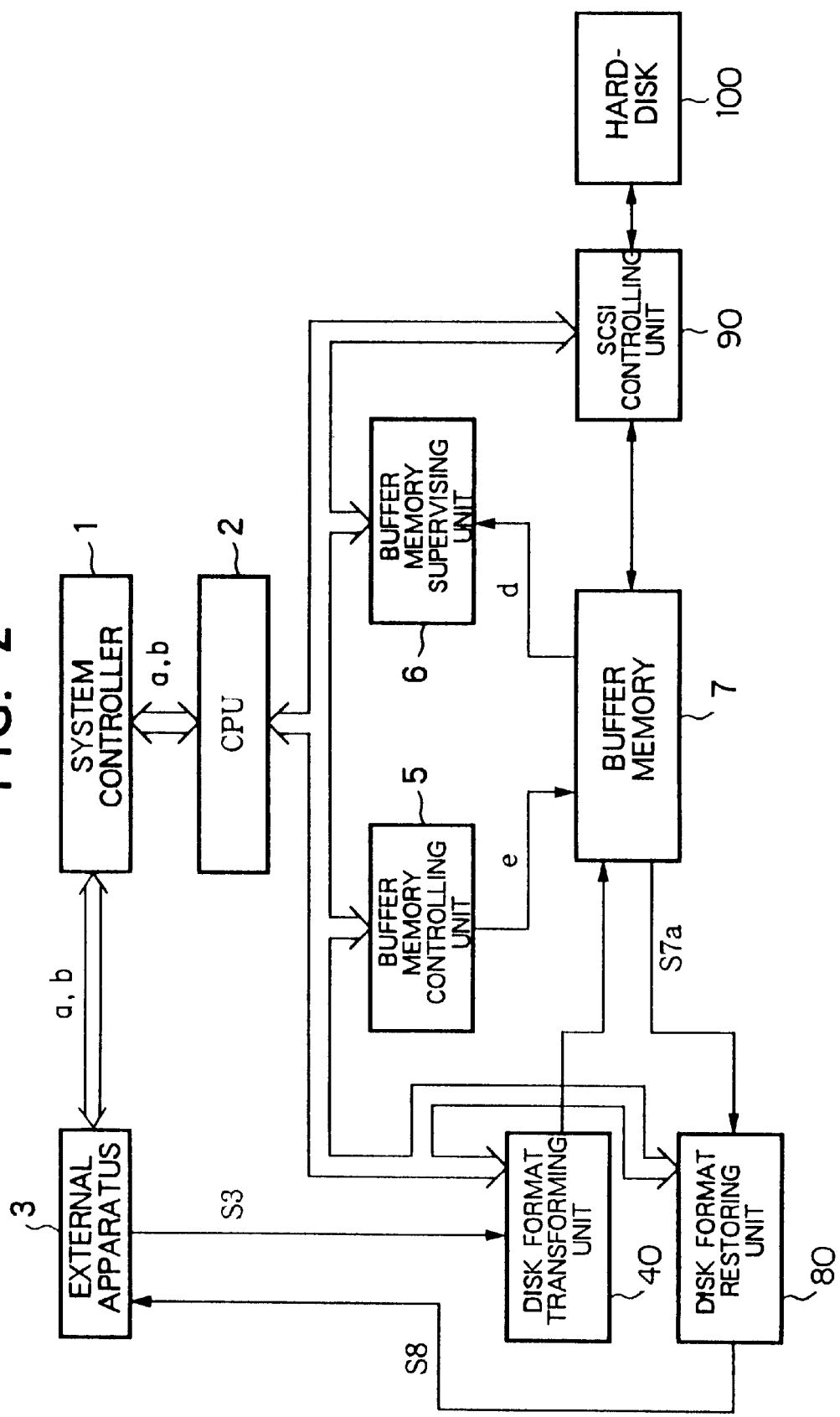
FIG. 2 is a view of the configuration of a data transfer apparatus according to an embodiment of the present invention when the storage medium of the non-linear access shown in FIG. 1 is a hard disk.

As shown in FIG. 1, the data transfer apparatus 11 is mainly comprised of a system controller 1, central processing unit (CPU) 2, format transforming unit 4, buffer memory controlling unit 5, buffer memory monitoring unit 6, buffer memory 7, and storage medium controlling unit 9. In FIG. 1, an external apparatus 3 and a storage medium 10 capable of non-linear access are connected to the data transfer apparatus 11. The data transfer apparatus 11 transfers data between the external apparatus 3 and the non-linear access storage medium 10. For example, when the non-linear access storage medium is provided in a VTR, it is possible to construct the data transfer apparatus 11 and the non-linear access storage medium capable in a single VTR. FIG. 2 illustrates the case where the non-linear access storage medium 10 is a hard disk 100, and the storage medium controlling unit 9 is an SCSI controller unit 90.

The external apparatus 3 is for example a hard disk drive (not shown) connected to the system controller 1 and receives a transfer rate signal from the present system controller 1. The data stored on the hard disk is reproduced by the external apparatus 3 so as to be transferred at the transfer rate indicated by the transfer rate signal a. Further, the external apparatus 3 determines the fastest rate of reproduction according to the state of reproduction and outputs this maximum reproduction rate h to the system controller 1. Further, the system controller 1 outputs the transfer rate signal a to the CPU 2. This is for instructing the rate of data transfer from the buffer memory 7 when outputting the data reproduced from the non-linear access storage medium described below to the external apparatus 3 via the buffer memory 7. The data is output from the buffer memory 7 to the external apparatus 3 via the format transforming unit 4 at the transfer rate indicated by the transfer rate signal a.

The buffer memory controlling unit 5 produces a read control signal e according to the control signal from the CPU 2 and outputs it to the buffer memory 7. As described above, when outputting the data from the data transfer apparatus 11 to the external apparatus 3, the control signal is output from the CPU 2 according to the transfer rate signal e from the system controller 1, then the read control signal e is produced according to the control signal by the buffer memory controlling unit 5 and output to the buffer memory 7.

The buffer memory 7 reads the data stored in the buffer memory 7 according to the read control signal e from the buffer memory controlling unit 5. When storing that data on the non-linear access storage medium 10, it outputs the read data to the storage medium controlling unit 9. When reproducing the data from the storage medium 10, it outputs the read data to the format transforming unit 4. Further the buffer memory 7 outputs a storage state signal d indicating the state of storage d1 of the buffer memory 7 to the buffer memory monitoring unit 6.

The buffer memory monitoring unit 6 monitors the areas of the buffer memory 7 where data has not yet been stored by the storage state signal d from the buffer memory 7 and outputs a control signal indicating the amount of data which can be stored in the buffer memory 7 to the CPU 2.

The system controller 1 continuously monitors whether the amount of the data which can be stored is over a predetermined threshold or not based on the information on the amount of the data which can be stored in the buffer memory 7 obtained via the CPU 2. That is, the system controller 1 compares a predetermined threshold value stored in for example a not shown random access memory (RAM) and the information on the amount of the data which can be stored in the buffer memory 7 obtained via the CPU 2 to continuously monitor whether the amount of the data which can be stored is over the predetermined threshold. When the system controller 1 decides that the amount of the data which can be stored is over the threshold value, this means the amount of the data which can be stored in the buffer memory 7 is large, so when controlling the storage of data In the non-linear access storage medium 10, that is, when controlling the transfer rate of the data from the external apparatus 3, the system controller 1 outputs a transfer rate signal a to the external apparatus 3 instructing an increase of the transfer rate of the data output from the external apparatus 3. Further, when the system controller 1 decides that the amount of the data which can be stored is lower than the threshold value, this means the amount of the data which can be stored in the buffer memory 7 is small, so the system controller 1 outputs a transfer rate signal a to the external apparatus 3 instructing a decrease of the transfer rate of the data output from the external apparatus 3. Similarly, when controlling the reproduction of data, where the data reproduced from the non-linear access storage medium 10 is transferred from the buffer memory 7 to the external apparatus 3, that is, when controlling the transfer rate of the data to the apparatus 3, when the system controller 1 decides the amount of the data which can be stored is over the threshold value, it outputs transfer rate signal a to the CPU 2 instructing an increase, while when the system controller 1 decides the amount of the data which can be stored is smaller than the threshold value, it outputs a transfer rate a signal to the CPU 2 instructing a decrease. Note that the system controller 1 determines the transfer rate so as not to exceed the maximum reproduction rate h input from the external apparatus 3.

The format transforming unit 4 transforms the format of the data to enable the data transferred from the external apparatus 3 to be stored on the non-linear access storage medium and the data from the non-linear access storage medium to be transferred to the external apparatus 3. In the example shown in FIG. 2, the format transforming unit 4 is divided into a disk format transforming unit 40 and a disk format restoring unit 80.

The disk format transforming unit 40 in FIG. 2 transforms the data transferred from the external apparatus 3, that is, the audio and/or video signal S3, to a disk format for storage on the non-linear access storage medium 10, that is, hard disk 100. Specifically, the data of the 4096 byte audio and/or video signal S3 is packed so as enable the audio and/or video signal S3 to be stored in one sector of the hard disk 100.

Further, the disk format restoring unit 80 restores the audio and/or video signal S8 to its original format and outputs it to the external apparatus 3 so as to enable the audio and/or video signal S7 a packed to the disk format from the buffer memory 7 to be stored in the external apparatus 3 or be transferred to the external apparatus 3.

The storage medium controlling unit 9 in FIG. 1 controls the communication of data between the non-linear access storage medium 10 connected with the data transfer apparatus 11 and the buffer memory 7. As shown in FIG. 2, when the storage medium 10 is a hard disk 100, the storage medium controlling unit 9 is an SCSI controlling unit 90. In this case, the communication of the audio and/or video signal between the buffer memory 7 and the hard disk 100 is controlled.

Below, the operation of the data transfer apparatus in the case of transferring the data from the external apparatus 3 to the non-linear access storage medium 10 will be explained with reference to FIG. 3. Here, the explanation will be given using the hard disk 100 shown in FIG. 2 as the non-linear access storage medium 10 shown in FIG. 1 and the disk format transforming unit 40 and the disk format restoring unit 80 shown in FIG. 2 as the disk format transforming unit 4 shown in FIG. 1. However, when transferring data from the external apparatus 3 to the non-linear access storage medium 10, the disk format restoring unit 80 is unnecessary, so the explanation of it will be omitted here.

Figure 3:
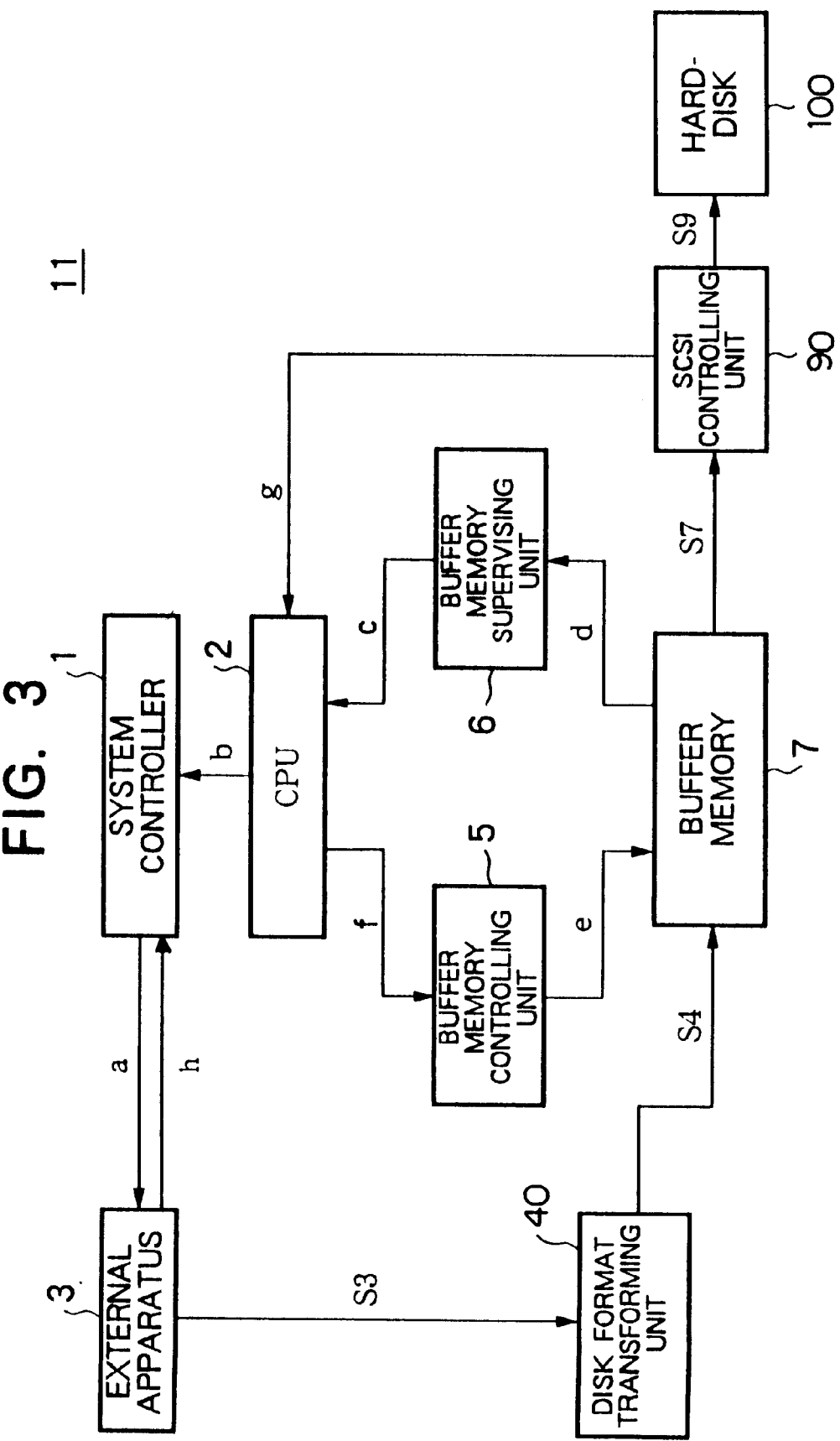
FIG. 3 is a view for explaining the operation when transferring an audio and/or video signal from an external apparatus to the hard disk in the data transfer apparatus shown in FIG. 2.

As shown in FIG. 3, the data transfer apparatus 11 outputs a transfer rate signal a indicating the transfer rate from the system controller 1 to the connected external apparatus 3 via an interface such as an RS 422. The external apparatus 3 outputs the data at the transfer rate indicated by the transfer rate signal a to the disk format transforming unit 4 of the data transfer apparatus 11. Further the external apparatus 3 outputs the maximum reproduction rate h to the system controller 1. This is because the system controller 1 determines the transfer rate so as not to exceed the maximum reproduction rate h input from the external apparatus 3. That is, if the system controller 1 were to output data to the external apparatus 3 at a transfer rate exceeding the capability of the external apparatus 3 to reproduce data, data could not be reproduced by the external apparatus 3 fast enough for the transfer rate.

The data output from the external apparatus 3, that is, the audio and/or video signal S3 shown in FIG. 3, is input to the format transforming unit 40 where it is transformed to a disk format corresponding to the storage format of the non-linear access storage medium 10, that is, the hard disk 100. The audio and/or video signal S4 transformed into the disk format is then output to the buffer memory 7.

Figure 4:
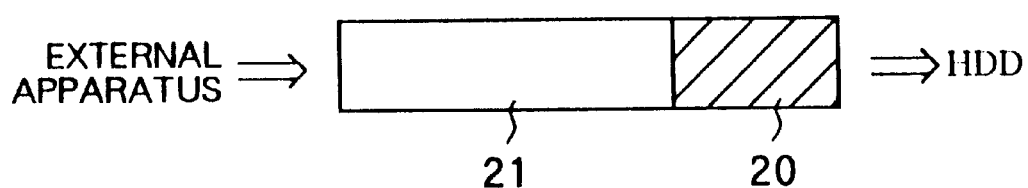
FIG. 4 is a view for explaining the state of storage of the buffer memory in the case shown in FIG. 3.

The audio and/or video signal S4 stored in the buffer memory 7 is output as the audio and/or video signal S7 to the SCSI controlling unit 90 in a predetermined order such as the order of input according to the control signal e from the buffer memory controlling unit 5. At this time, as shown in FIG. 4, the state of storage d1 of the buffer memory 7, that is, the areas 20 where data is stored and the areas 21 where data is not yet stored, is monitored by the buffer memory monitoring unit 6. Toward this end, a storage state signal d indicating the state of storage d1 is output from the buffer memory 7 to the buffer memory monitoring unit 6.

Figure 5:
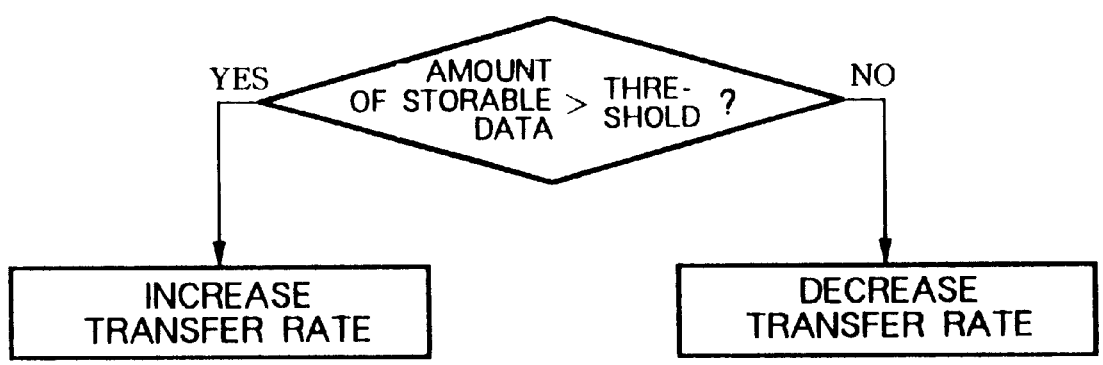
FIG. 5 is a flowchart for explaining the processing in the system controller shown in FIG. 3.

A storable data signal c indicating the amount c1 of the data which can be stored in the buffer memory 7 is output from the buffer memory monitoring unit 6 to the system controller 1 (as the storable data signal b) via the CPU 2 based on the storage state signal d. Then, as shown in FIG. 5, the system controller 1 compares the amount of the data c1 and the predetermined threshold value. When the amount c1 of data which can be stored is larger than the predetermined threshold value, it increases the transfer rate to an extent not exceeding the maximum reproduction rate h. This situation occurs when the data reproduction rate of the external apparatus 3 is faster than the storage rate of the hard disk 100.

On the other hand, when the result of the comparison of the system controller 1 is that the predetermined threshold value is larger than the amount of data which can be stored, the system controller 1 decreases the transfer rate. This occurs when the data reproduction rate of the external apparatus 3 is slower than the storage rate of the hard disk 100.

Further, it is possible to prevent the transfer rate from being changed when the amount c1 of the data which can be stored and the threshold value are equal.

The CPU 2 outputs a read control signal to the buffer memory control unit 5. The buffer memory control unit 5 outputs a read control command e to the buffer memory 7 according to the read control signal f. The buffer memory 7 reads the audio and/or video signal S4 stored in the buffer memory 7 and outputs the same to the SCSI controlling unit 9 according to the read control command e. The audio and/or video signal S7 input to the SCSI control unit 9 is actually written on the hard disk 100 according to a write command g1 from the CPU 2. Further, the SCSI controlling unit 9 outputs a write end command when finishing writing the audio and/or video signal S7 to the hard disk 100. The CPU 2 maintains a grasp over the state of writing of the audio and/or video signal S7 from the SCSI controlling unit 9 to the hard disk 100.

Next, the operation of the data transfer apparatus 1 when transferring data from the non-linear access storage medium 10 to the external apparatus 3 will be explained referring to FIG. 6. Here, the explanation will be given by using the hard disk 100 shown in FIG. 2 as the non-linear access storage medium 10 shown in FIG. 1 and the disk format transforming unit 40 and the disk format restoring unit 80 shown in FIG. 2 as the disk format transforming unit 4 shown in FIG. 1. When transferring data from the non-linear access storage medium 10 to the external apparatus 3, the disk format transforming unit 40 is unnecessary, so an explanation of it is omitted here.

Figure 6:
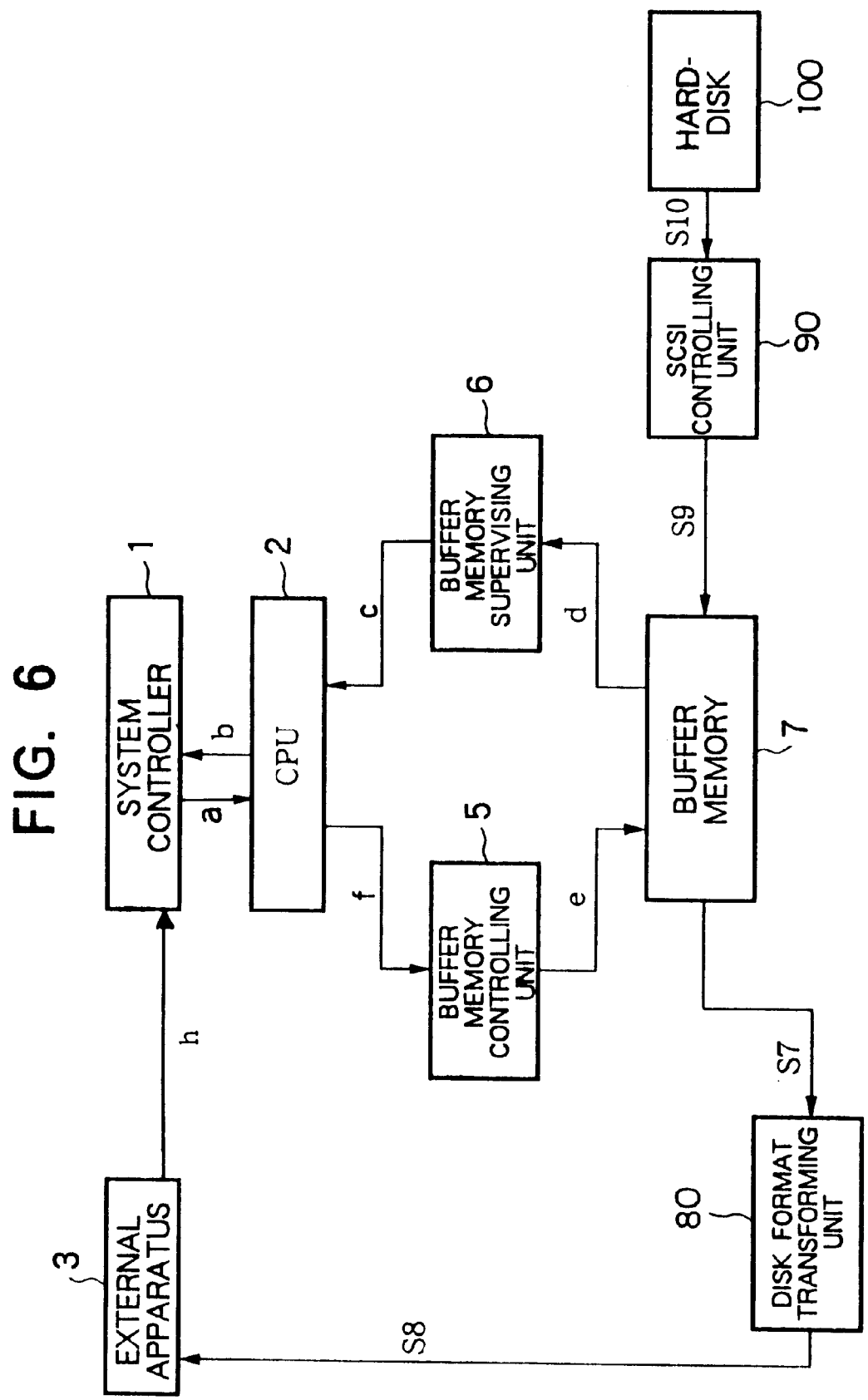
FIG. 6 is a view for explaining the operation when transferring an audio and/or video signal from a hard disk to an external apparatus in the data transfer apparatus shown in FIG. 2.

As shown in FIG. 6, the audio and/or video signal S10 is stored as the audio and/or video signal S9 in the buffer memory 7 via the SCSI controlling unit 90.

Then, the audio and/or video signal S9 stored in the buffer memory 7 is read out based on the read control signal e from the buffer memory controlling unit 5, then is output as the audio and/or video signal S7 to the disk format restoring unit 80.

Figure 7:
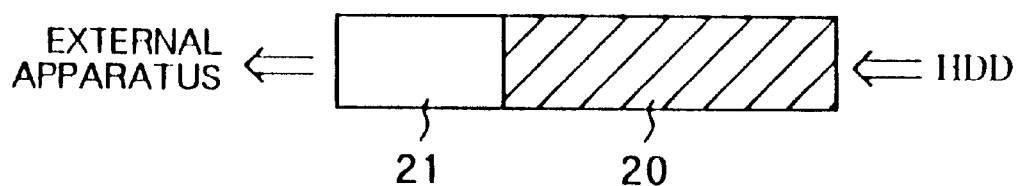
FIG. 7 is a view for explaining the state of storage of the buffer memory in the case shown in FIG. 6, and FIG. 8 to a flowchart for explaining the processing in the system controller shown in FIG. 6.

At this time, the state of storage d1 of the buffer memory 7, that is, the areas 20 where data is stored and the areas 21 where data is not yet stored, is monitored as shown in FIG. 7 by the buffer memory monitoring unit 6. Toward this end, a storage state signal d indicating the state of storage d1 of the buffer memory 7 is output from the buffer memory 7 to the buffer memory monitoring unit 6.

Figure 8:
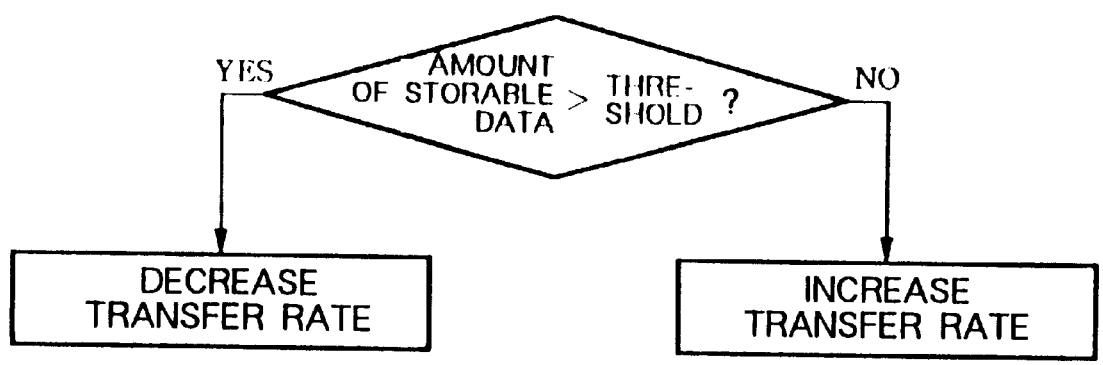

The storable data signal c indicating the amount c1 of the data which can be stored in the buffer memory 7 is output from the buffer memory monitoring unit 6 to the system controller 1 via the CPU 2 (as the storable data signal b) according this storage state signal d. Then, as shown in FIG. 8, the system controller 1 outputs a transfer rate signal a to the external apparatus 3 instructing a decrease when the amount c1 of the data which can be stored is larger than the predetermined threshold value. This when the processing rate of the storage etc. of the audio and/or video signal S8 by the external apparatus 3 is faster than the reproduction rate of the hard disk 100.

On the other hand, when the result of the comparison of the system controller 1 to that the predetermined threshold value is larger than the amount of the data which can be stored, the system controller 1 outputs a transfer rate signal a to the external apparatus 3 instructing an increase of the transfer rate. This is when the processing rate of the storage etc. of the audio and/or video signal S8 by the external apparatus 3 is slower than the reproduction rate of the hard disk 100. Further, it is possible to prevent the transfer rate from being changed when the amount c1 of the data which can be stored and the threshold value are equal.

The disk format restoring unit 80 restores the audio and/or video signal S7 output from the buffer memory 7 from the storage format of the hard disk 100 to a format capable of transfer to the external apparatus 3, then the external apparatus 3 stores the signal on a predetermined storage medium, for example, a hard disk (not shown).

As described above, according to the data transfer apparatus 11 of the present invention, the transfer rate of the external apparatus 3 is controlled on the basis of the state of storage of the buffer memory 7, so it is possible to achieve a transfer of data to the non-linear access storage medium 10 using the maximum capacity of the maximum reading and writing rate. As a result, fast data transfer between the external apparatus 3 and the non-linear access storage medium can be achieved by an inexpensive and simple configuration.

Note that while the embodiment shown in FIG. 2 and FIG. 3 was explained by using the hard disk 100 as the non-linear access storage medium shown in FIG. 1, it is possible to use any non-linear access storage medium such as a magnetic disk, magneto-optical disk, or DVD.

Further, in the embodiment described above, the system controller 1, buffer memory controlling unit 5, and buffer memory monitoring unit 6 monitored the buffer memory 7 and controlled the transfer rate, but it is possible to replace the above described functions of the system controller 1, buffer memory controlling unit 5, and buffer memory monitoring unit 6 by a single control unit.

Further, it is possible to find the amount of the data which can be stored in the buffer memory 7 by using a plurality of threshold values. In this case, it is possible to increase or decrease the transfer rate when the amount of the data which can be stored exceeds a first threshold value, decrease or increase the transfer rate when the amount of the data which can be stored exceeds a second threshold value, and keep the transfer rate unchanged when the amount of the data which can be stored is between the first threshold and the second threshold.

Further, other methods of management of the state of storage of the buffer memory 7 can be used within the scope of the present invention.

As described above, according to the data transfer apparatus and method of the same and the buffer memory input and output controlling apparatus and method of the same of the present invention, it is possible to make a recording and reproduction apparatus using a non-linear access storage medium operate at the maximum transfer rate. As a result, fast data transfer between non-linear access storage media and between a non-linear access storage medium and a linear access storage medium can be achieved by an inexpensive and simple configuration.

What is claimed is:

1. A data transfer/recording apparatus for transferring, in a first mode, first data reproduced from a first storage medium and recording the transferred data to a second, local storage medium that is capable of non-linear access, and for transferring, in a second mode, second data reproduced from the second storage medium and recording the transferred second data in the first storage medium, said apparatus comprising:
    a temporary storing means for temporarily storing the first data reproduced from the first storage medium during the first mode, and for temporarily storing the second data reproduced from the second storage medium during the second mode;
    a storage state monitoring means for monitoring the state of storage of the temporary storing means in both said first and second modes, and outputting a storable data signal indicating the amount of data which can be stored in said temporary storing means;
    a transfer rate controlling means for controlling a transfer rate of the first data reproduced from the first storage medium in the first mode, and a transfer rate of the second data reproduced from the second storage medium in the second mode, based on the storable data signal output by the storage state monitoring means;
    recording means for recording the transferred first data to said second, local storage medium in the first mode, and for recording the transferred second data to said first storage medium in the second mode;
    wherein said second storage medium is selected from the group consisting of a hard disk that forms a part of said apparatus, and a portable storage medium that is insertable into and removable from said apparatus.

2. The apparatus as set forth in claim 1, wherein said transfer rate controlling means increases the transfer rate of the data reproduced from said first storage medium when said amount of data which can be stored is larger than a predetermined reference value when transferring data from said first storage medium to said second storage medium.

3. The apparatus as set forth in claim 2, wherein
    further provision is made of a processing means for reproducing data from said first storage medium and transferring the reproduced data, wherein
    said transfer rate controlling means outputs a transfer rate signal for controlling said processing means so as to increase the transfer rate of the data reproduced from said first storage medium when the amount of the data which can be stored is larger than a predetermined reference value when transferring data from said first storage medium to said second storage medium, and
    said processing means increases the transfer rate of the data stored on said first storage medium on the basis of said transfer rate signal.

4. The apparatus as set forth in claim 1, wherein said transfer rate controlling means decreases the transfer rate of the data reproduced from said first storage medium when the amount for the data which can be stored is smaller than a predetermined reference value when transferring data from said first storage medium to said second storage medium.

5. The apparatus as set forth in claim 4, wherein
    further provision is made of a processing means for reproducing data from said first storage medium and transferring the reproduced data, said transfer rate controlling means outputs a transfer rate signal for controlling said processing means so as to decrease the transfer rate of the data reproduced from said first storage medium when said amount of the data which can be stored is smaller than a predetermined reference value when transferring data from said first storage medium to said second storage medium, and said processing means decreases the transfer rate of the data stored on said first storage medium on the basis of said transfer rate signal.

6. The apparatus as set forth in claim 1, wherein said transfer rate controlling means decreases the transfer rate of the data reproduced from said second storage medium when said amount of the data which can be stored is larger than a predetermined reference value when transferring data from said second storage medium to said first storage medium.

7. The apparatus as set forth in claim 6, wherein further provision is made of a read controlling means for controlling the reading of the data stored on said temporary storing means, said transfer rate controlling means outputs a control signal instructing a decrease of the reading rate to said read controlling means when the amount of said data which can be stored is larger than a predetermined reference value when transferring data from said second storage medium to said first storage medium, and said read controlling means decreases the reading rate of the data stored in said temporary storing means on the basis of said control signal.

8. The apparatus as set forth in claim 1, wherein said transfer rate controlling means outputs a control signal instructing an increase of the transfer rate of the data reproduced from said second storage medium when said the amount of the data which can be stored is smaller than a predetermined reference value when transferring data from said second storage medium.

9. The apparatus as set forth in claim 8, wherein further provision is made of a read controlling means for controlling the reading of the data stored on said temporary storing means, said transfer rate controlling means outputs a control signal instructing an increase of the reading rate to said read controlling means when the amount of the data which can be stored is smaller than a predetermined reference value when transferring data from said second storage medium to said first storage medium, and said read controlling means increases the reading rate of the data stored in said temporary storing means on the basis of said control signal.

10. The apparatus as set forth in claim 2, wherein said apparatus is a video recorder.

11. The apparatus as set forth in claim 2, wherein the data reproduced from said first storage medium and the data reproduced from the second storage medium are video data and/or audio data.

12. The apparatus as set forth in claim 2, wherein said recording means comprises a SCSI controlling unit.

13. A data transfer/recording method for transferring, in a first mode, first data reproduced from a first storage medium and recording the transferred first data to a second, local storage medium that is capable of non-linear access, and for transferring, in a second mode, second data reproduced from the second storage medium and recording the transferred second data in the first storage medium, said method comprising:

a first step of temporarily storing, in a temporary storing means, the first data reproduced from the first storage medium during the first mode, and the second data reproduced from the second storage medium during the second mode;

a second step of monitoring the state of storage of the data stored in the temporary storing means, and determining the amount of data which can be stored in the temporary storing means, in both the first and second modes;

a third step of controlling the transfer rate of at least one of the first data reproduced from the first storage medium in the first mode, and the second data reproduced from the second storage medium in the second mode, according to the state of storage of the temporary storage means monitored in the monitoring step, on the basis of the amount of data which can be stored as determined in the monitoring step; and recording the transferred first data to the second storage medium in the first mode, and recording the transferred second data to the first storage medium in the second mode;

wherein said second storage medium is selected from the group consisting of a hard disk that forms part of a device within which said monitoring, controlling and recording are performed, and a portable storage medium that is insertable into and removable from said device.

14. The method as set forth in claim 13, wherein said third step includes a step of increasing the transfer rate of the data reproduced from said first storage medium when the amount of the data which can be stored is larger than a predetermined reference value when transferring data from said first storage medium to said second storage medium.

15. The method as set forth in claim 14, wherein further provision is made of a fourth step of reproducing the data from said first storage medium and transferring the reproduced data, said third step includes a step of outputting a transfer rate signal for controlling said fourth step so as to increase the transfer rate of the data reproduced from said first storage medium when said amount of the data which can be stored is larger than a predetermined reference value when transferring data from said first storage medium to said second storage medium, and the fourth step increases the transfer rate of the data stored on said first storage medium on the basis of the transfer rate signal.

16. The method as set forth in claim 13, wherein said third step includes a step of controlling the transfer rate of the data reproduced from said first storage medium when the amount of the data which can be stored is smaller than a predetermined reference value when transferring data from said first storage medium to said second storage medium.

17. The method as set forth in claim 16, wherein further provision is made of a fourth step of reproducing the data from said first storage medium and transferring the reproduced data, said third step includes a step of outputting a transfer rate signal for controlling said fourth step so as to decrease the transfer rate of the data reproduced from said first storage medium when the amount of the data which can be stored is smaller than a predetermined reference value when transferring data from said first storage medium to said second storage medium, and the fourth step decreases the transfer rate of the data stored on said first storage medium on the basis of the transfer rate signal.

18. The method as set forth in claim 13, wherein said third step controls the transfer rate of the data reproduced from said second storage medium so as to decrease the reading rate when the amount of the data which can be stored is larger than a predetermined reference value when transferring data from said second storage medium to said first storage medium.

19. The method as set forth in claim 18, wherein said third step outputs a control signal instructing a decrease of the reading rate when the amount of the data which can be stored is larger than a predetermined reference value when transferring data from said second storage medium to said first storage medium and further provision is made of a fourth step of decreasing the reading rate of the data stored in said temporary storing means on the basis of said control signal.

20. The method as set forth in claim 13, wherein said third step performs control to increase the transfer rate of the reproduced data from said second storage medium when the amount of the data which can be stored is smaller than a predetermined reference value when transferring data from said second storage medium.

21. The method as set forth in claim 20, wherein said third step outputs a control signal instructing an increase of the reading rate when the amount of the data which can be stored is smaller than a predetermined reference value when transferring data from said second storage medium to said first storage medium and further provision is made of a fourth step of increasing the reading out rate of the data stored said temporary storing means on the basis of said control signal output in said third step.

22. The method as set forth in claim 14, wherein said device is a video recorder.

23. The method as set forth in claim 13, wherein the data reproduced from said first storage medium and the data reproduced from the second storage medium are video data and/or audio data.

24. A data transfer/recording apparatus for transferring, in a first mode, first data reproduced from a first storage medium and recording the transferred data to a second, local storage medium that is capable of non-linear access, and for transferring, in a second mode, second data reproduced from the second storage medium and recording the transferred second data in the first storage medium, said apparatus comprising:

a buffer for temporarily storing the first data reproduced from the first storage medium during the first mode, and for temporarily storing the second data reproduced from the second storage medium during the second mode;

a storage state monitor for monitoring the state of storage of the buffer in both said first and second modes, and outputting a storable data signal indicating the amount of data which can be stored in said buffer;

a transfer rate controller for controlling a transfer rate of the first data reproduced from the first storage medium, and a transfer rate of the second data reproduced from the second storage medium, based on the storable data signal output by the storage state monitor; and a recording portion for recording the transferred first data to said second, local storage medium in the first mode, and for recording the transferred second data to said first storage medium in the second mode;

wherein said second storage medium is selected from the group consisting of a hard disk that forms a part of said apparatus, and a portable storage medium that is insertable into and removable from said apparatus.

25. The apparatus as set forth is claim 24, wherein said data transfer recording apparatus comprises a SCSI controlling unit.

26. A data transfer/recording method for selectively transferring first data reproduced from a first storage medium and recording the transferred first data to a second, local storage medium that is capable of non-linear access, or second data reproduced from the second storage medium and recording the transferred second data in the first storage medium, said method comprising:

temporarily storing, in a buffer, the first data reproduced from the first storage medium, or the second data reproduced from the second storage medium;

monitoring the state of storage of the first or second data stored in the buffer, and determining the amount of data which can be stored in the buffer;

controlling the transfer rate of the first data reproduced from the first storage medium, or the second data reproduced from the second storage medium, according to the state of storage of the buffer monitored in the monitoring step, on the basis of the amount of data which can be stored as determined in the monitoring step; and recording the transferred first data to the second storage medium, or the transferred second data to the first storage medium;

wherein said second storage medium is selected from the group consisting of a hard disk that forms part of a device within which said monitoring, controlling and recording are performed, and a portable storage medium that is insertable into and removable from said device.

* * * * *